United States Patent [19]

Ishikawa et al.

[11] Patent Number: 4,894,518

[45] Date of Patent: Jan. 16, 1990

[54] TOASTER OVEN WITH INITIAL TEMPERATURE COMPENSATION AND SENSOR CHECK

[75] Inventors: Kazuhiko Ishikawa, Kashiwara; Yoichi Takahashi, Osaka, both of Japan

[73] Assignee: Sharp Kabushiki Kaisha, Osaka, Japan

[21] Appl. No.: 294,994

[22] Filed: Jan. 6, 1989

Related U.S. Application Data

[63] Continuation of Ser. No. 135,549, Dec. 18, 1987, abandoned, which is a continuation of Ser. No. 65,660, Jun. 22, 1987, abandoned, which is a continuation of Ser. No. 796,886, Nov. 12, 1985, abandoned.

[30] Foreign Application Priority Data

Dec. 6, 1984 [JP] Japan .................................. 59-259746
Jan. 12, 1985 [JP] Japan .................................... 60-2665

[51] Int. Cl.$^4$ .............................................. H05B 1/02
[52] U.S. Cl. .................................... 219/413; 219/492; 219/494; 99/332; 99/333; 99/338
[58] Field of Search .............. 219/412, 413, 490, 491, 219/492, 494; 99/327, 328, 329 R, 329 RT, 332, 333, 388

[56] References Cited

U.S. PATENT DOCUMENTS

| | | | |
|---|---|---|---|
| 2,264,611 | 12/1941 | Bemis | 219/412 X |
| 2,429,736 | 10/1947 | Wales | 219/412 X |
| 4,296,312 | 10/1981 | Salem | 219/501 |
| 4,345,145 | 8/1982 | Norwood | 219/413 X |
| 4,382,175 | 5/1983 | Huggler | 219/413 |
| 4,481,396 | 11/1984 | Matsubayashi et al. | 219/400 X |
| 4,626,663 | 12/1986 | Tateda | 219/504 |

Primary Examiner—William M. Shoop, Jr.
Assistant Examiner—H. L. Williams
Attorney, Agent, or Firm—Flehr, Hohbach, Test, Albritton & Herbert

[57] ABSTRACT

An electric oven such as a toaster oven according to this invention includes in addition to a heating chamber, a heater for the heating chamber and a temperature detector for measuring the temperature therein, a control device serving to automatically determine a target temperature on the basis of the initial temperature inside the heating chamber so that a desired degree of heating can be effected independently of the initial temperature inside the heating chamber by switching off the power supply when the detected temperature reaches the target temperature thus set. According to another embodiment of the present invention, minimum and maximum heating times are set such that the control device will additionally serve to continue the heating independently of the measured temperature if the preset minimum heating time has not elapsed from the beginning of the heating and to shut off the power supply independently of the measured temperature if the preset maximum heating time has elapsed, so that the heating can be effected safely and dependably even if the temperature detector malfunctions.

10 Claims, 5 Drawing Sheets

TOASTER OVEN WITH INITIAL TEMPERATURE COMPENSATION AND SENSOR CHECK

This is a continuation of application Ser. No. 135,549 filed Dec. 18, 1987 now abandoned, which is a continuation of application Ser. No. 65,660 filed June 22, 1987 now abandoned, which is a continuation of application Ser. No. 796,886 filed Nov. 12, 1985 now abandoned.

This invention relates to an electric oven and more particularly to an electric oven such as a toaster oven equipped with a temperature sensor which causes the heating to be stopped automatically when the temperature of the object to be heated reaches a desired level.

Electric ovens of the conventional type making use of a timer mechanism to control the length of time during which power is supplied to the heater have the disadvantage in that the same heating effect may not be obtained if the initial oven temperature is different even though the heating time is the same. In order to remedy this situation, various corrective means have been considered but they tend to complicate the structure and operation of the oven without significantly improving the situation.

Conventional electric ovens of another type are equipped with a temperature sensor such as a thermistor to detect the temperature of the heating chamber. The measured temperature is compared with a preset value and the heating is stopped if the measured temperature exceeds this preset value. Electric ovens of this type, too, have disadvantages. Firstly, such an electric oven will stop the heating if there is a short circuit in the temperature sensor due to mechanical vibrations or the like, even though the object in the heating chamber may not have been heated sufficiently yet because the sensor may wrongfully conclude that the preset temperature has been reached. If there is a broken wire in the temperature sensor, on the other hand, the heating may be continued even after the object to be heated has become sufficiently warm. In this situation, the temperature sensor has wrongfully concluding that the temperature has not reached the preset level and there is the danger not only of overheating but also of starting a fire.

It is therefore an object of the present invention in view of the above to provide an electric oven such as a toaster oven which stops the heating when the temperature inside its heating chamber reaches a target temperature which is preset according to the initial temperature of the heating chamber so that heating can be effected in a consistent manner time after time.

It is another object of the present invention to provide a safe electric oven which can perform its heating operation without causing overheating even if its temperature sensor is malfunctioning.

The above and other objects of the present invention are attained by providing an electric oven such as a toaster oven which comprises a heater, a means to detect the temperature inside the oven, a level-setting means for setting a target temperature on the basis of the initial temperature inside the oven, a judging means for judging whether the temperature inside the oven has reached the level of the target temperature and a heater control means for controlling the power supply to the heater when it is detected that the temperature inside the oven has reached the target temperature. An electric oven according to another embodiment of the present invention comprises a heating chamber, a heater for the heating chamber, a detector means for measuring the temperature inside the heating chamber, an opening/closing means for setting the power input to the heater in an ON or OFF position, time-measuring means for measuring preset minimum and maximum heating times and a control means for controlling the aforementioned opening/closing means such that it will be in the OFF position when the detected temperature is greater than a predetermined temperature, that it will be in the ON position independently of the detected temperature before the minimum heating time has elapsed, and that it will be in the OFF position independently of the detected temperature after the maximum heating time has elapsed.

The accompanying drawings, which are incorporated in and form a part of the specification, illustrate embodiments of the present invention and, together with the description, serve to explain the principles of the invention. In the drawings.

Figure 1:
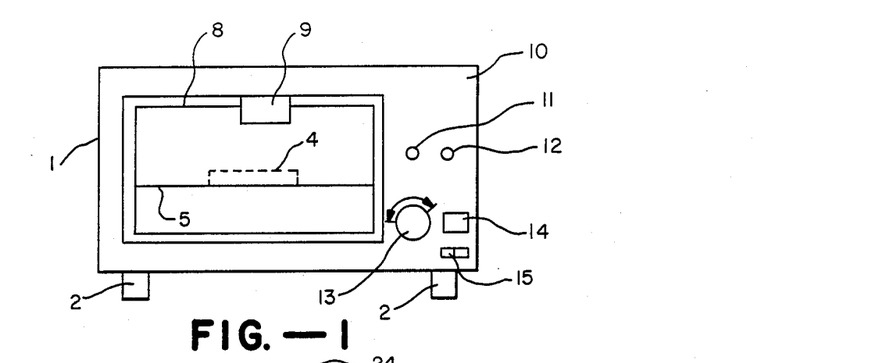
FIG. 1 is a front view of an electric oven according to one embodiment of the present invention.
Figure 2:
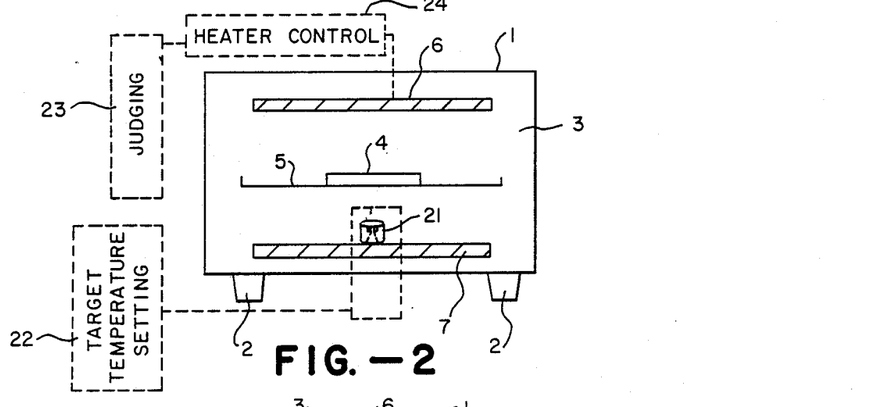
FIG. 2 is a cross-sectional front view of the electric oven of FIG. 1 for schematically showing its interior structure as well as its control unit.
Figure 3:
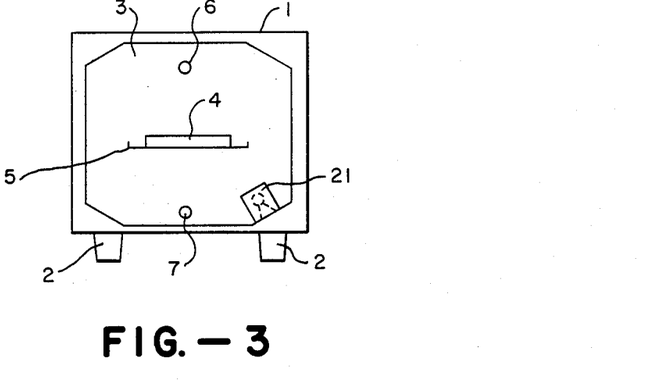
FIG. 3 is a side cross-sectional view of the electric oven of FIGS. 1 and 2 for schematically showing its interior.

Mechanical structure of an electric oven according to one embodiment of the present invention is schematically illustrated in FIGS. 1, 2 and 3 wherein the same numerals indicate corresponding components. Numeral 1 indicates a housing having legs 2 at the bottom. Numeral 3 indicates a heating chamber (or sometimes simply referred to as the oven) which contains a grill 5 for placing objects 4 to be heated (or toasted) such as bread. An upper heater 6 and a lower heater 7 are disposed respectively above and below the grill 5.

Numeral 8 indicates a door which is for opening and closing the front opening of the housing 1 and is equipped with a handle 9 secured to its front surface at an elevated position. Numeral 10 indicates a control panel at one side of the front surface and includes a power indicator 11, a broil (or "top brown") indicator 12, a darkness control knob 13, a starting button 14 and a mode selection switch 15.

Figure 4:
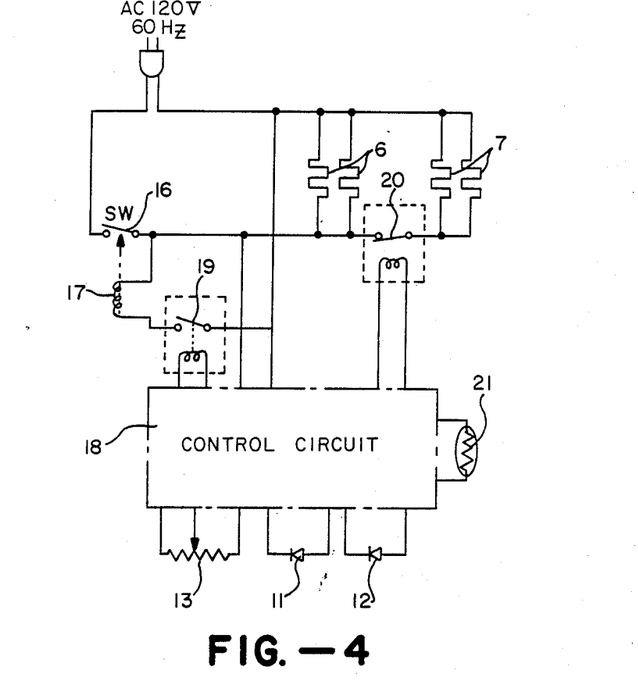
FIG. 4 is a circuit diagram for the electric oven of FIGS. 1-3.

Reference being now made additionally to FIG. 4, which is a circuit diagram for the oven, numeral 16 indicates a power ON-OFF switch which is connected in series with the parallel connection of the upper and lower heaters 6, 7. The power ON-OFF switch 16 is adapted to close when the starting button 14 is pressed and to open when the door 8 is opened or when a current is passed through a solenoid 17 by means of a relay switch 19 which closes in response to a stop command from an electronic control circuit 18.

Numeral 20 indicates a relay switch for the broil (or "top brown") mode operation, inserted between the parallel connection of the upper and lower heaters 6, 7. It is adapted to open when the mode selection switch 15 is set for the broil mode so that the heating will be effected only by the upper heater 6. In principle, power supply to the upper heater 6 will continue until the user opens the door 8. For safety, however, the current to the upper heater 6 is automatically shut off also by the electronic control circuit 18 after a predetermined length of time has elapsed.

The other setting for the mode selection switch 15 is called "auto cook mode". When this mode is selected, a current is passed through both the upper heater 6 and through the lower heater 7, and the temperature inside the heating chamber 3 is detected by a temperature detecting means 21 such as a thermistor in such a way that the current to the upper and lower heaters 6, 7 is stopped when the temperature inside the heating chamber 3 reaches a predetermined level. The temperature detecting means 21 is covered by a cylindrical member so that there will be no direct influence of the heat on it from the heater 7.

Numeral 22 in FIG. 2 indicates a target temperature setting means for setting on the basis of the initial temperature inside the heating chamber 3 a target temperature at which the desired heating (or toasting) process is considered completed. When pieces of bread are toasted successively, for example, the temperature curve inside the heating chamber 3 is different between the first time and the second time, and so is the target temperature for obtaining the same level of darkness on the toasted bread. This is because the initial temperature inside the heating chamber 3 is different between the times, and it was experimentally discovered that there is a following relationship between the initial temperature $T_0$ (within the range of zero to 120° C.) inside the heating chamber 3 and the target temperature $T_1$:

$$T_1 = aT_0 + (b \pm c)$$

where a and b are constants, a representing the rate at which the target temperature increases as a function of the initial temperature and b representing the target temperature when the initial temperature is 0° C., and c is a parameter to be varied, depending upon h dark the toasted bread should appear. If a=0.5 and b=90, a standard result is obtained with c=0. If a darker result is desired, the parameter c should be increased, or changed in the plus direction by means of the darkness control knob 13. If a lighter result is desired, it should be decreased, or changed similarly in the minus direction.

Numeral 23 indicates a judging means for determining whether the temperature inside the heating chamber 3 has reached the target temperature or not. When the temperature inside the heating chamber 3 is found to have reached the target temperature, a heater control means 24 (including, for example, the relay switch 19 and the solenoid 17 shown in FIG. 4) schematically shown in FIG. 2 is activated to shut off the current to the upper and lower heaters 6, 7.

Figure 5:
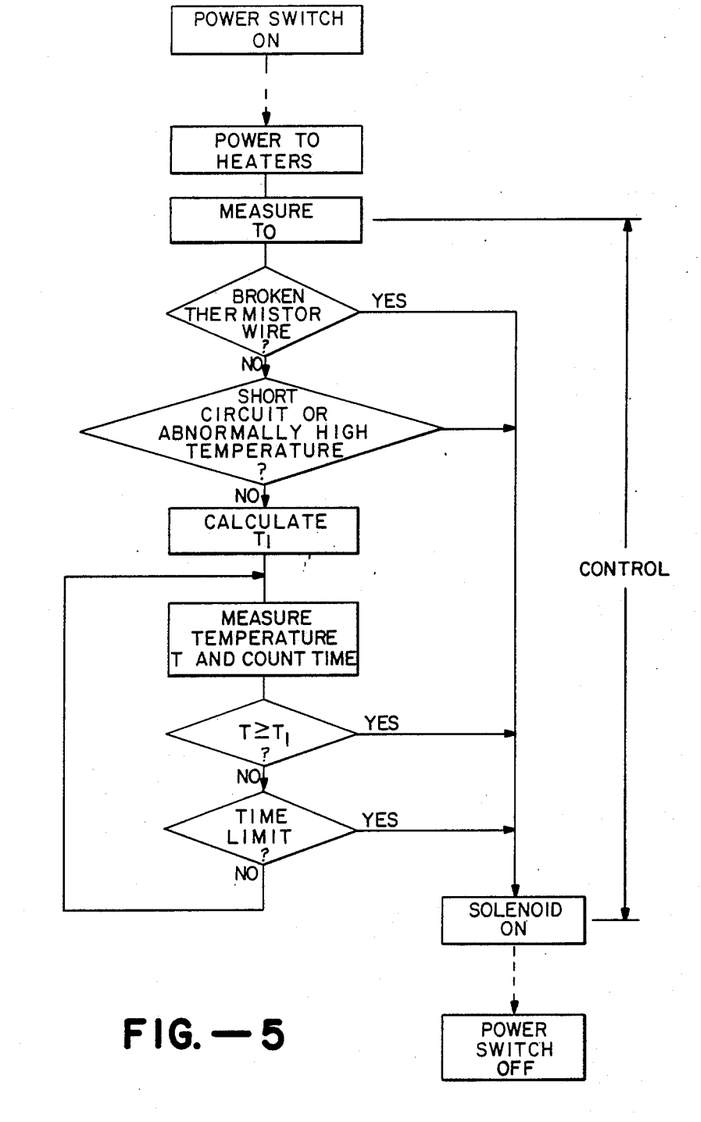
FIG. 5 is an action flow chart for the "auto cook mode" of the circuit of FIG. 4.

The operation of the circuit of FIG. 4 in the "auto cook mode" is explained next by way of FIG. 5. When the power switch 16 is switched on (Step 1) and power is supplied to the heaters 6, 7 (Step 2), the initial temperature $T_0$ inside the heating chamber 3 is measured by the temperature detecting means 21 such as a thermistor (Step 3). Next, it is determined by a detecting means whether there is a broken wire in the thermistor 21 (Step 4) and if the answer is YES, the solenoid 17 is switched on (Step 10) and the power switch 16 is switched off (Step 11). If the answer is NO, it is determined whether there is a short circuit in the thermistor 21 and whether the temperature inside the heating chamber 3 is abnormally high (Step 5). If the answer to either is YES, the program proceeds to Step 10. If the answer is NO, the aforementioned target temperature setting means 22 sets a target temperature $T_1$ (Step 6) according to the formula given above.

In Step 7, the temperature inside the heating chamber 3 is measured and counting of time is started. Subsequently, the measured temperature T is compared with the target temperature $T_1$ by the judging means 23 (Step 8) and if the measured temperature T is found to have reached the target temperature $T_1$, the program proceeds to Step 10. Otherwise, it is checked whether a preset length of time has elapsed (Step 9) and the program either returns to Step 7 (if NO) or proceeds to Step 10 (if YES).

In summary, an electric oven according to the embodiment described above determines a target temperature on the basis of the initial temperature inside the heating chamber and stops the heating when the temperature inside the heating chamber reaches the target temperature. According to another embodiment of the present invention, however, the heating is not stopped even after the measured temperature inside the heating chamber has reached the target temperature unless a predetermined minimum time has elapsed from the beginning of the heating operation. As schematically described in a block diagram of FIG. 6, an electric oven according to the second embodiment of the present invention includes a minimum heating time setting means 31 and a maximum heating time setting means 32 in addition to components already described above in connection with FIGS. 1-4 such as a heating chamber 3 equipped with a temperature detecting means 21 and heaters 6, 7, a control means 18 and a power ON-OFF means 16. As shown generally by arrows in FIG. 6, minimum and maximum heating times $t_{min}$ and $t_{max}$ are inputted respectively from the minimum and maximum heating time setting means 31 and 32 to the control means 18 together with the measured temperature T inside the heating chamber 3 and the control means 18 controls the power supply to the heaters 6, 7 through the power ON-OFF means 16 on the basis of these inputted data, causing the power ON-OFF means 16 to switch off the power supply to the heaters 6, 7 if the measured temperature T exceeds a predetermined target temperature $T_1$, to continue the power supply independently of the measured temperature T if the inputted minimum heating time has not elapsed and to switch off the power supply independently of the measured temperature if the inputted maximum heating time has already elapsed.

Operations of the electric oven of FIG. 6 will be explained next with additional reference to FIG. 7. Let $T_0$ be the initial temperature inside the heating chamber 3 on the basis of which the target temperature $T_1$ is set. The minimum heating time setting means 31 sets a minimum time $t_{min}$ required to heat the object to be heated inside the heating chamber 3. The maximum heating time setting means 32 sets a maximum time $t_{max}$ beyond which the heating should not continue under any circumstances. If the temperature T measured by the temperature detector 21 (which may not be the same as the real temperature inside the heating chamber 3, depending on whether the temperature detector 21 is malfunctioning) changes with time as shown by Curve b, reaching the target temperature $T_1$ at a time $t_1$ intermediate between $t_{min}$ and $t_{max}$, the power ON-OFF means 16 is caused to stop the heating instantly. If the temperature detector 21 is malfunctioning and the measured temperature T exceeds the target temperature $T_1$ from the beginning or it changes with time as shown by Curve a such that the measured temperature T reaches the target temperature $T_1$ before the present minimum heating time $t_{min}$ elapses, however, the control means 18 does not cause the power ON-OFF means 16 to terminate the power supply immediately but to continue it until the preset minimum heating time $t_{min}$ elapses. If, on the other hand, the measured temperature T does not reach the target temperature $T_1$ before the preset maximum heating time $t_{max}$ elapses as shown by Curve c, the control means 18 causes the power supply to be terminated instantly at $t_{max}$. In summary, a reasonable result is obtainable with an electric oven according to this embodiment even if the temperature detector 21 malfunctions although the result of heating may not be exactly the same as originally planned. Moreover, there is no danger of overheating the oven or of causing a fire.

An electric oven according to the embodiment described above and illustrated by FIGS. 6 and 7 may generally be structured as shown in FIGS. 1-3. When a microcomputer is used for its control means, its functional and operational relationships with the components described above may be as shown by the block diagram of FIG. 8 wherein components described above are assigned the same indicator numerals, numeral 35 indicates a microcomputer and numeral 36 indicates its interface. The microcomputer 35 of a known type includes a central processing unit CPU, read only memories ROM and random access memories RAM. The ROM stores experimentally derived programs for determining $t_{min}$ and $t_{max}$ depending on the kind of items to be heated, calculating $T_1$ on the basis of $T_0$, comparing the measured temperature T inside the heating chamber 3 with the target temperature $T_1$ and outputting commands to the power ON-OFF means 16. The RAM stores the target temperature $T_1$ which is adjustable by means of the darkness control knob 13.

Figure 6:
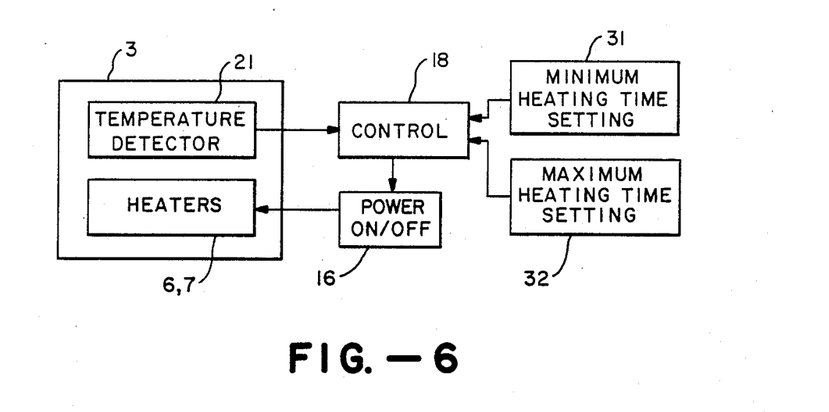
FIG. 6 is a block diagram for an electric oven according to another embodiment of the present invention.
Figure 7:
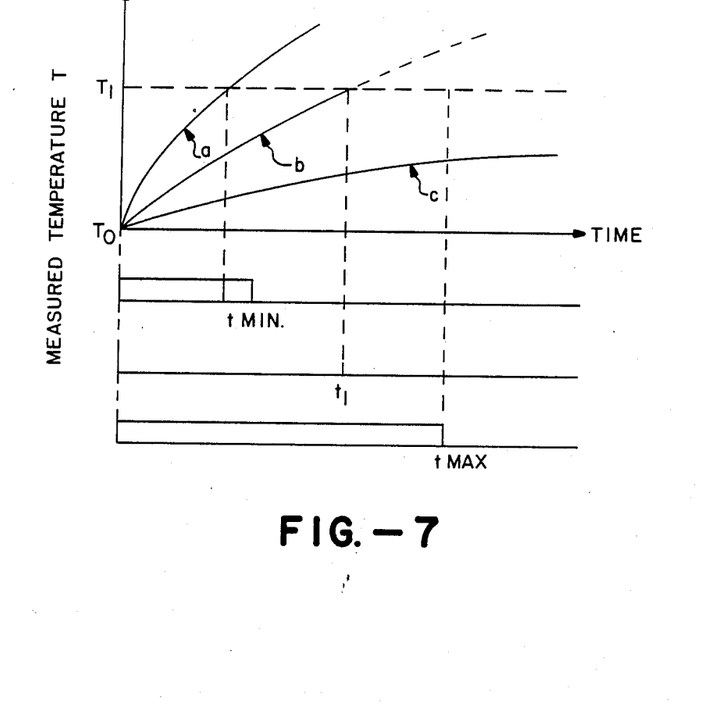
FIG. 7 is a timing diagram for explaining the operations of the electric oven of FIG. 6.
Figure 8:
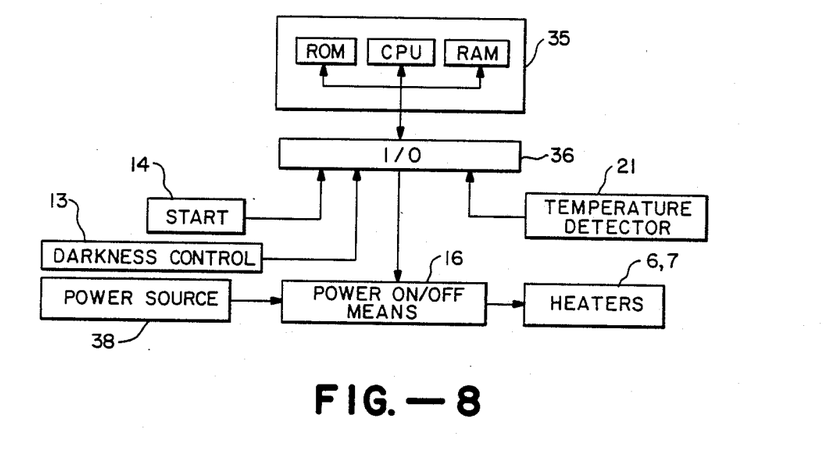
FIG. 8 is a block diagram of the control means for the electric oven of FIG. 6.
Figure 9:
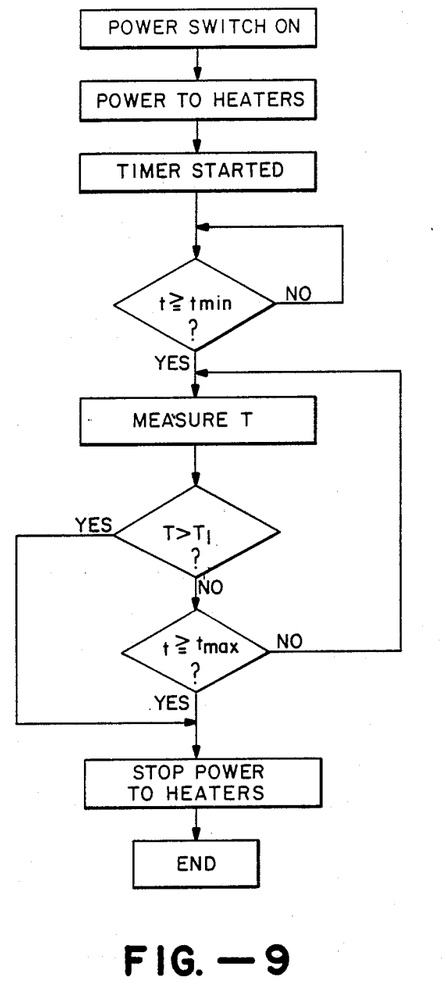
FIG. 9 is an action flow chart for the control means of FIG. 8.

The operation of an electric oven according to the embodiment illustrated by FIGS. 6, 7 and 8 is explained next by way of a flow chart, reference now being made additionally to FIG. 9. When the starting button 14 is pressed after an object to be heated is placed inside the heating chamber 3 and the door 8 is closed, the microcomputer 35 responds by switching on the power ON-OFF means 16, causing power to flow from a source 38 to the heaters 6, 7. At the same time, a timing mechanism is activated by a program stored in the ROM. When the timer detects that the elapsed time t has exceeded the minimum heating time $t_{min}$ (t greater than or equal to $t_{min}$), the microcomputer 35 begins to input the measured temperature T in the heating chamber 3 from the temperature detector 21 for comparing it with the target temperature $T_1$ which has been calculated on the basis of the initial temperature in the heating chamber 3 and stored in the RAM. If the measured temperature T exceeds the target temperature $T_1$ before the maximum heating time $t_{max}$ elapses, the power ON-OFF switch is switched off and the power supply to the heaters 6, 7 stops.

If there is a short circuit in the temperature detector 21 such that the target temperature $T_1$ is reached immediately after the time-counting is started, the electric oven of this embodiment does not stop the power supply to the heaters 6, 7 immediately but continues the heating until the minimum heating time $t_{min}$ elapses. As a result, heating can be accomplished in spite of the short circuit in the temperature detector 21 although the heating may be somewhat insufficient. If there is a broken wire in the temperature detector 21, for example, and the target temperature $T_1$ is not reached, on the other hand, the power ON-OFF switch is turned off as soon as the maximum heating time is reached. This prevents overheating of the oven.

In summary, electrical ovens of the present invention are safe and dependable. The heating is not blindly stopped simply because the measured temperature has reached a target temperature while it may be stopped although the target temperature has not been reached yet if a preset minimum heating time has not elapsed.

The foregoing description of the invention has been presented for purposes of illustration and description. It is not intended to be exhaustive or to limit the invention to the precise form disclosed. For example, FIGS. 1-3 are not intended to describe the preferred dimensional relationships of various components or distribution of control buttons and the like. Sheath heaters may preferably be used for the heating but they are not intended to limit the scope of the invention. Minor changes and modifications which may be obvious to a person skilled in the art should be considered within the scope of this invention.

What is claimed is:
1. A toaster oven comprising
a heating chamber for heating pieces of bread therein,
heating means for heating said heating chamber,
temperature detecting means for measuring the temperature inside said heating chamber,
target temperature setting means for calculating a target temperature by a linear equation $aT_0+(b?\ c)$ where $T0$ is an initial temperature inside said heating chamber measured by said temperature detecting means at the start of a heating process by said heating means, a and b are experimentally predetermined constants and c is a parameter selectably adjusted according to desired darkness of bread,
judging means for determining whether the temperature inside said heating chamber measured by said temperature detecting means has reached said target temperature, and
heater control means programmed to stop the power supply to said heating means automatically either when said judging means determines that the temperature detected by said temperature detecting means has reached said target temperature or when the time elapsed form the start of said heating process has reached a preset maximum time interval independently of whether or not the temperature inside said heating chamber detected by said temperature detecting means has reached said target temperature.
2. The toaster oven of claim 1 further comprising a darkness control means for selectably varying the value of said parameter c.
3. The toaster oven of claim 1 wherein said temperature detecting means includes a thermistor.
4. The toaster oven of claim 3 wherein said heater control means is further programmed to stop said power supply to said heating means if a short circuit or a broken wire is found in said thermistor.
5. A toaster oven comprising a heating chamber for heating pieces of bread therein,
heating means for heating said heating chamber,
temperature detecting means for detecting the temperature inside said heating chamber,
power switching means for switching on and off the input of power to said heating means,
heating time storing means for storing an experimentally predetermined minimum heating time and an experimentally predetermined maximum heating time which is longer than said minimum time, and
control means programmed to cause said power switching means to supply power to said heating means form a starting time independently of the temperature detected by said temperature detecting means if said minimum heating time has not elapsed from said starting time, to switch off the power supply to said heating means if the temperature detected by said temperature means after said minimum heating time has elapsed from said starting time is greater than a target temperature which is automatically calculated according to a linear equation $aT_0 + (b \pm c)$ where $T_0$ is an initial temperature inside said heating chamber measured by said temperature detecting means at the start of a heating process by said heating means, a and b are experimentally determined constants and c is a parameter selectably adjusted according to desired darkness of the bread, and to switch off the power supply to said heating means independently of the temperature detected by said temperature detecting means if said maximum heating time has elapsed from said starting time.

6. The toaster oven of claim 5 wherein said heating means includes sheath heaters.

7. The toaster oven of claim 5 wherein said control means include a microcomputer.

8. The toaster oven of claim 5 wherein said target temperature is calculated by a stored linear equation $aT_0 + (b \pm c)$ where $T_0$ is the initial temperature inside said heating chamber at said starting time as measured by said temperature detecting means, a and b are experimentally predetermined constants and c is selectably determined parameter.

9. The toaster oven of claim 8 further comprising a means for selectably inputting a value of said parameter c.

10. The toaster oven of claim 8 further comprising memory means storing values of said constants a and b.

* * * * *

UNITED STATES PATENT AND TRADEMARK OFFICE
CERTIFICATE OF CORRECTION

PATENT NO. : 4,894,518
DATED : January 16, 1990
INVENTOR(S) : Kazuhiko Ishikawa, et al.

It is certified that error appears in the above—identified patent and that said Letters Patent is hereby corrected as shown below:

<u>IN THE CLAIMS</u>:

Column 6, Claim 1, line 7, change "(b?c)" to --(b±c)--.

Claim 1, line 8, change "T0" to --$T_0$--.

Claim 1 line 23, change "form" to --from--.

Column 7, Claim 5, line 19, after "temperature" insert --detecting--.

Signed and Sealed this

Eleventh Day of December, 1990

*Attest:*

HARRY F. MANBECK, JR.

*Attesting Officer*   *Commissioner of Patents and Trademarks*